May 1, 1945.　　　　L. A. STEELE　　　　2,374,788
MECHANICAL CALCULATOR OF GEOGRAPHICAL POSITION
FROM CELESTIAL OBSERVATIONS
Filed July 25, 1944　　　3 Sheets-Sheet 3
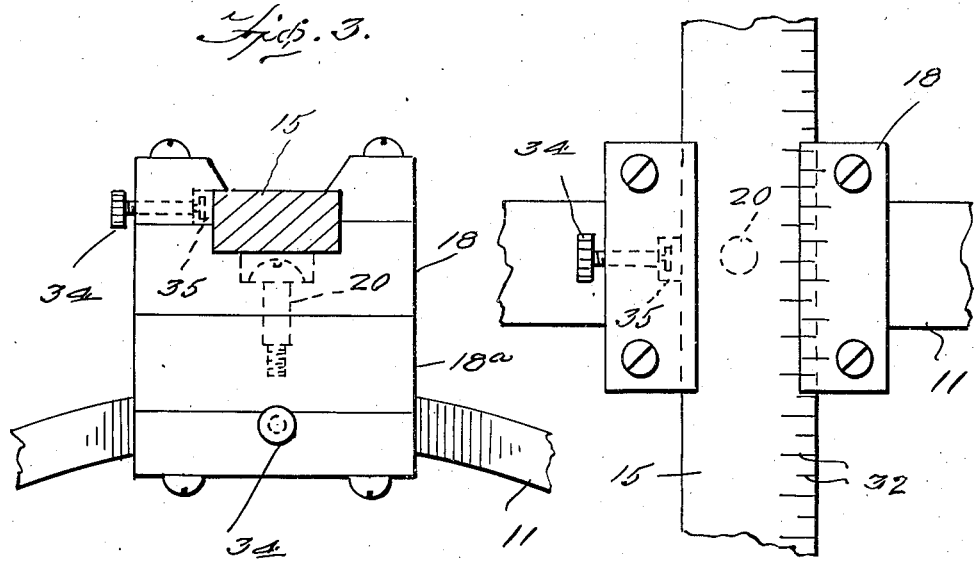
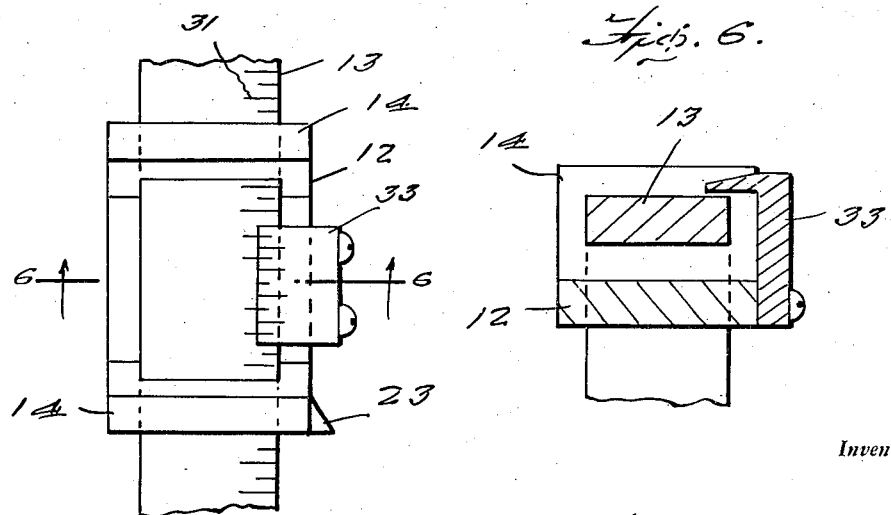
Inventor
Louise A. Steele
By Clarence A. O'Brien
and Harvey B. Jacobson
Attorneys Patented May 1, 1945

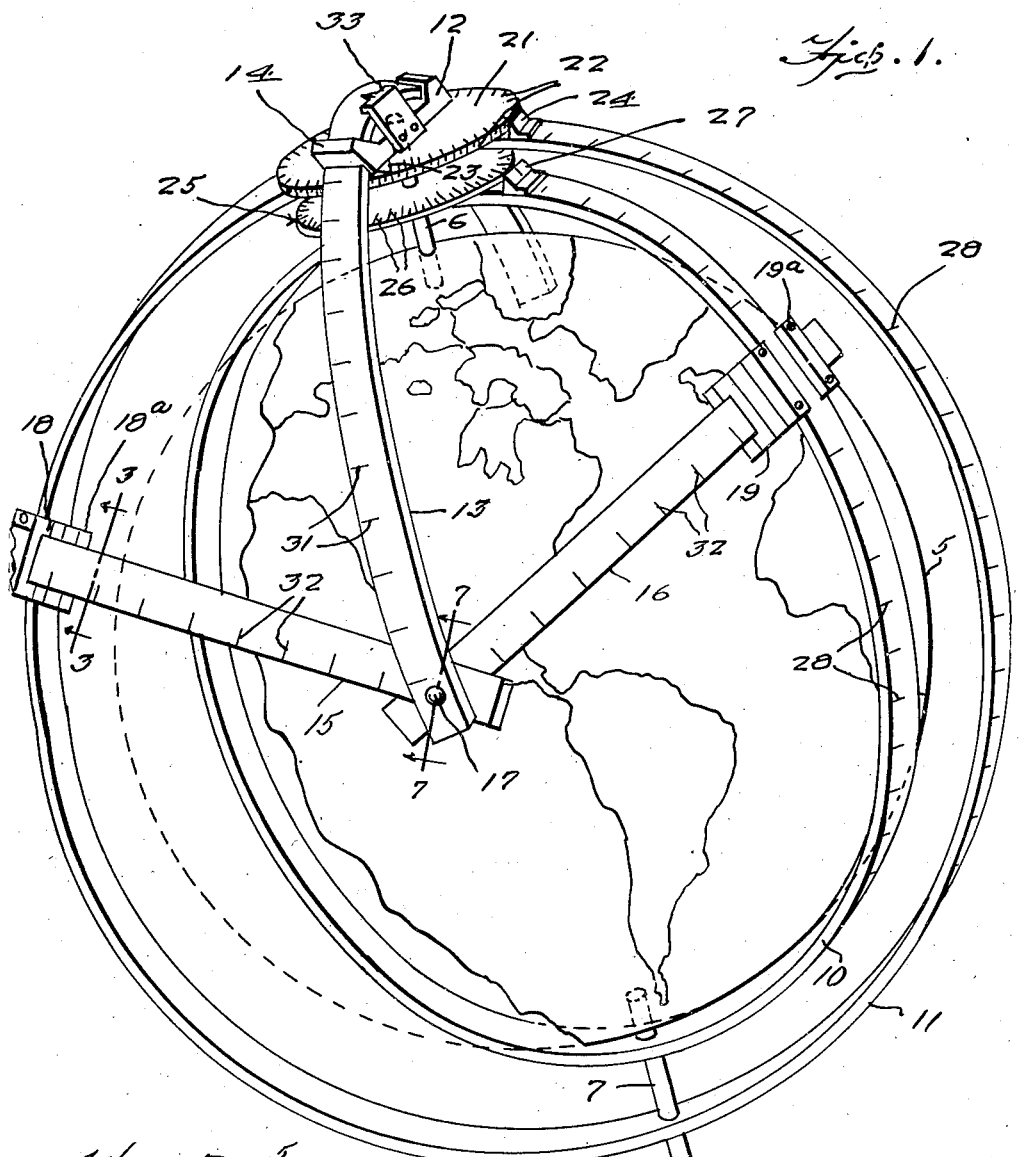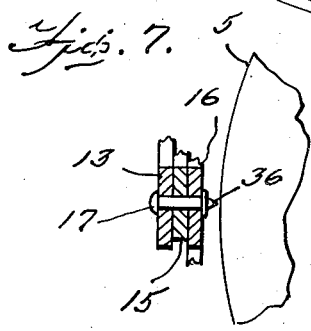

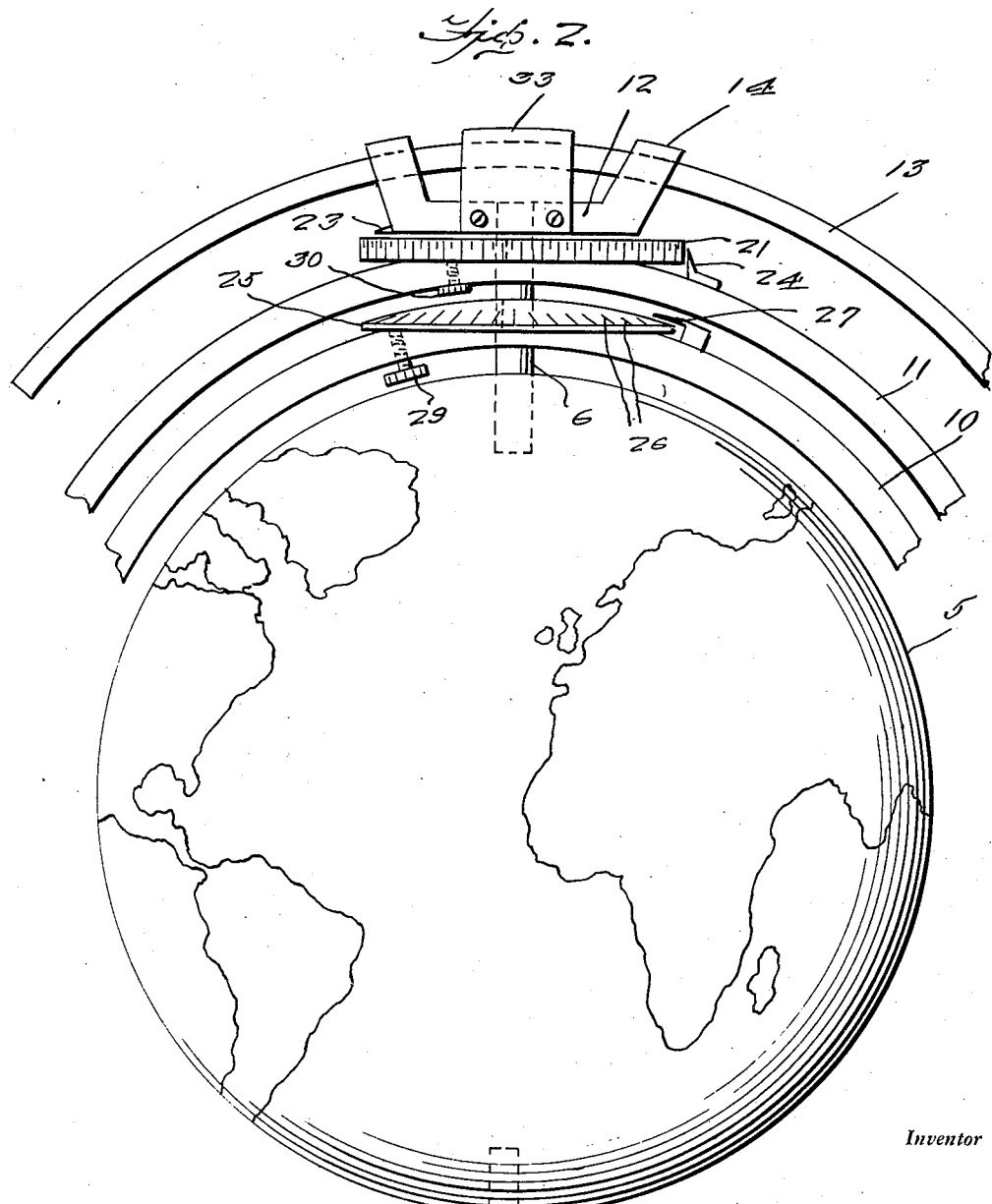

2,374,788

UNITED STATES PATENT OFFICE 2,374,788

MECHANICAL CALCULATOR OF GEOGRAPHICAL POSITION FROM CELESTIAL OBSERVATIONS

Louise A. Steele, Los Angeles, Calif.

Application July 25, 1944, Serial No. 546,519

3 Claims. (Cl. 33—1)

This invention relates to a device by means of which a person may readily calculate his geographical position after observing two selected separated heavenly bodies and determining their positions over the earth's surface at the instant of observation.

The primary object of the present invention is to provide a simple, compact and efficient device or instrument of the above kind, which is economical to manufacture, easy to use and otherwise well adapted to meet with a successful commercial use.

Specific objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is an elevational view, partly broken away, of a calculator constructed in accordance with the present invention.

Figure 2 is a fragmentary elevational view thereof with parts rotated to a different position to more clearly reveal details of construction.

Figure 3 is an enlarged fragmentary detail view taken substantially on line 3—3 of Figure 1.

Figure 4 is a plan view of the construction shown in Figure 3.

Figure 5 is a fragmentary plan view showing a portion of the 180 degree arcuate longitude strip and its mounting and guide bracket.

Figure 6 is a section taken on line 6—6 of Figure 5.

Figure 7 is a fragmentary section taken substantially on line 7—7 of Figure 1.

Referring in detail to the drawings, 5 indicates a globe having projecting polar pins 6 and 7 fixed therein. The south polar pin 7 may be fixed to and extended from a base 8 as at 9, so that the globe 5 is supported in a stationary position.

Rotatably mounted on the polar pins 6 and 7 in spaced concentric relation to each other and in concentric surrounding relation to the globe 5 are two 360 degree longitude rings 10 and 11. Rotatably mounted on the upper end of the north polar pin 6 is a mounting and guide bracket 12 for a 180 degree arcuate longitude strip 13, the bracket 12 having spaced aligned loops 14 through which the strip 13 slidably extends. The adjacent ends of two 90 degree arcuate altitude strips 15 and 16 are pivotally connected to each other and to the adjacent end of the strip 13, as at 17, the other or remote ends of said strip 15 and 16 being slidable in clamps 18 and 19 that are centrally swiveled, as at 20 (Fig. 3), to similar clamps 18a and 19a, respectively slidable on the longitude rings 11 and 10. Fixed on the polar pin 6 between the ring 11 and bracket 12 is a disc 21 having longitude graduations 22 on the margin and edge thereof, respectively cooperating with pointer elements 23 and 24 fixed on the bracket 12 and ring 11. Another disc 25 is fixed on the pin 6 between the rings 10 and 11 and has marginal longitude graduations 26 which cooperate with a pointer element 27 secured on the ring 10.

The rings 10 and 11 are graduated from 90° at the pins 6 and 7 down to zero half-way between the latter, as at 28. The 180 degree arcuate longitude strip 13 is graduated from 90° near the ends thereof to zero half-way between the ends of said strip 13. The 90 degree arcuate latitude strips 15 and 16 are graduated from 90° at pin 17 to zero toward the free ends of said strips 15 and 16 that extend through the clamps 18 and 19. Set screws 29 and 30 extend through the rings 10 and 11, respectively, and are arranged to impinge the under sides of the discs 25 and 21, respectively, to releasably secure said rings 10 and 11 in any desired position to which the latter may be rotatably adjusted relative to said discs 21 and 25. The graduations on strip 13 are indicated at 31 and those on the strips 15 and 16 at 32. Also, a pointer element 33 is fixed to one side of bracket 12 between its loops 14 and is arranged to cooperate with the graduations of strip 13 as more clearly shown in Figures 5 and 6. The clamps 18, 18a, 19 and 19a cooperate with the graduations of the respective elements 15, 11, 16 and 10. It will of course be understood that the zero graduations of rings 10 and 11 occur coincident with the equator of the globe 5.

As shown more clearly in Figures 3 and 4, each of the clamps 18, 18a, 19 and 19a carries a clamping screw 34 whose inner end is swiveled to a clamping block 35 arranged to be tightly engaged with a separated edge of the associated strip or ring 15 or 16 or 10 or 11, so as to releasably secure the associated clamp and strip or clamp and ring in any desired relatively adjusted position.

In using the present device, observations are made on two selected adjacent heavenly bodies by conventional methods using a sextant or a transit, and the positions of the heavenly bodies over the earth's surface are found from the nautical almanac, for the instant of observation. On ring 10, clamp 19a is set at the latitude over which one heavenly body was located on the earth's surface at the time of observation, the clamp 19a being secured in this position. Ring 10 is then set and clamped by means of screw 29 in a position corresponding to the longitude over which this heavenly body was located on the earth's surface at the time of observation, proper setting being had by use of the indicator element 27 in connection with the graduations of disc 25.

Strip 16 is then slid until the reading at clamp 19 is the same as the angle of elevation (corrected for refraction) of the said heavenly body, clamp 19 being tightened to secure the strip 16 in this adjustment. Clamp 18a is then set on ring 11 at the latitude over which the other heavenly body was located at the time of observation, said clamp 18a being tightened to fix the adjustment. Ring 11 is then rotated so as to set the same at the longitude at which the second heavenly body was located at the time of observation, and clamp 18 is secured to fix this adjustment. The position of ring 11 last mentioned is obtained by use of indicator element 24 in connection with the graduations of disc 21. The strip 15 is then slid relative to clamp 18 until the reading on said clamp is the same as the angle of elevation (corrected for refraction) of the second-named heavenly body, clamp 18 being tightened to secure this adjustment. Strip 13, during these adjustments, has been free to slide through the bracket 12 and to rotate on pin 6 so that its longitude position may be noted by a reading of the pointer element 23 in connection with graduations of disc 21. The reading now on disc 21 is the longitude of the observer at the time of observation, and the reading on strip 13 is his latitude. As shown clearly in Figure 7, the pivot pin 17 extends inwardly into close proximity with the surface of the globe 5, as at 36, thereby correctly indicating the observer's position on the earth's surface. The graduations on rings 10 and 11 are therefore in coincidence with latitudes of the globe, and the graduations on disc 21 are coincident with the longitudes of the globe 5.

From the foregoing description, it is believed that the construction and operation, as well as the advantages of the present invention, will be readily understood and appreciated by those skilled in the art.

What I claim is:

1. A mechanical calculator of geographical positions from celestial observations, comprising a stationary globe, polar pins fixed to and projecting from the globe, two concentric longitude rings encircling the globe and rotatable on said pins, said rings being graduated from 90° at the pins to 0° midway between the pins, two discs centrally fixed on one of said pins and each having marginal degree graduations, one disc being located directly outwardly of one of the rings and the other disc being located directly outwardly of the other ring, pointer elements on the respective rings cooperating with the graduations of the respective discs, a guide bracket rotatable on said one pin outwardy of the rings and discs, a 180 degree arcuate longitude strip slidably guided in said bracket and graduated from 90° adjacent the ends to 0° midway between the ends, a pointer element carried by said guide bracket and cooperating with the graduations of said arcuate longitude strip, 90 degree arcuate altitude strips pivoted at corresponding ends to one end of the longitude strip, each altitude strip being graduated from 90° at their pivotally connected ends to 0 toward their opposite ends, clamps slidably adjustable on the respective rings, and other clamps swiveled to the first-named clamps and slidably adjustably receiving the said other ends of the respective altitude strips.

2. A mechanical calculator of geographical positions from celestial observations, comprising a stationary globe, polar pins fixed to and projecting from the globe, two concentric longitude rings encircling the globe and rotatable on said pins; said rings being graduated from 90° at the pins to 0° midway between the pins, two discs centrally fixed on one of said pins and each having marginal degree graduations, one disc being located directly outwardly of one of the rings and the other disc being located directly outwardly of the other ring, pointer elements on the respective rings cooperating with the graduations of the respective discs, a guide bracket rotatable on said one pin outwardly of the rings and discs, a 180 degree arcuate longitude strip slidably guided in said bracket and graduated from 90° adjacent the ends to 0° midway between the ends, a pointer element carried by said guide bracket and cooperating with the graduations of said arcuate longitude strip, 90 degree arcuate altitude strips pivoted at corresponding ends to one end of the longitude strip, each altitude strip being graduated from 90° at their pivotally connected ends to 0° toward their opposite ends, clamps slidably adjustable on the respective rings, and other clamps swiveled to the first-named clamps and slidably adjustably receiving the said other ends of the respective altitude strips, means to secure the rings in rotatably adjusted positions with respect to said discs, and a pin pivotally connecting the adjacent ends of the altitude and longitude strips and projecting inwardly to a point adjacent the surface of the globe.

3. A mechanical calculator of geographical positions from celestial observations, comprising a stationary globe, polar pins fixed to and projecting from the globe, two concentric longitude rings encircling the globe and rotatable on said pins, said rings being graduated from 90° at the pins to 0° midway between the pins, two discs centrally fixed on one of said pins and each having marginal degree graduations, one disc being located directly outwardly of one of the rings and the other disc being located directly outwardly of the other ring, pointer elements on the respective rings cooperating with the graduations of the respective discs, a guide bracket rotatable on said one pin outwardly of the rings and discs, a 180 degree arcuate longitude strip slidably guided in said bracket and graduated from 90° adjacent the ends to 0° midway between the ends, a pointer element carried by said guide bracket and cooperating with the graduations of said arcuate longitude strip, 90 degree arcuate altitude strips pivoted at corresponding ends to one end of the longitude strip, each altitude strip being graduated from 90° at their pivotally connected ends to 0 toward their opposite ends, clamps slidably adjustable on the respective rings, and other clamps swiveled to the first-named clamps and slidably adjustably receiving the said other ends of the respective altitude strips, means to secure the rings in rotatably adjusted positions with respect to said discs, and a pin pivotally connecting the adjacent ends of the altitude and longitude strips and projecting inwardly to a point adjacent the surface of the globe, each of said clamps including screw clamping means engageable with an edge of the associated strip or ring for securing the clamps in adjusted position relative to the rings and for securing the altitude strips in adjusted position with respect to their clamps.

LOUISE A. STEELE.